INVENTOR.
WILLIAM TURKEWITSCH
BY
ATTORNEYS

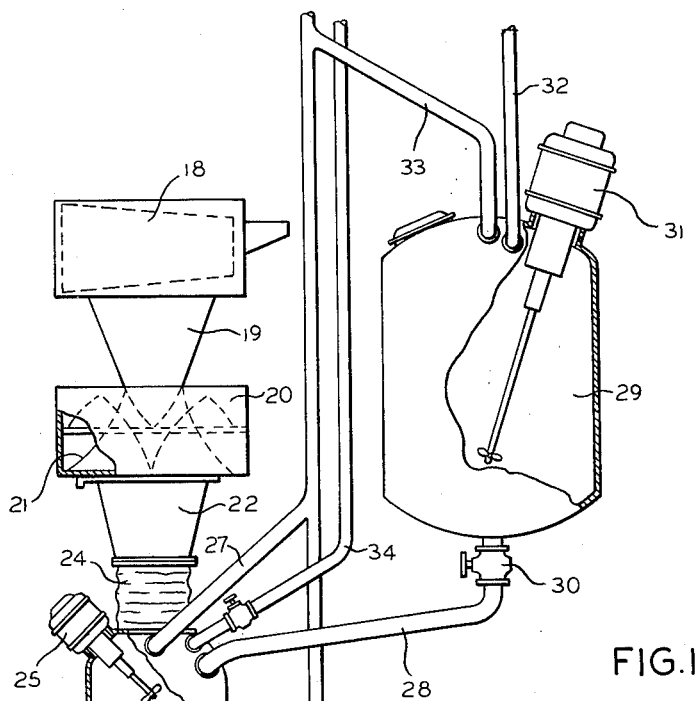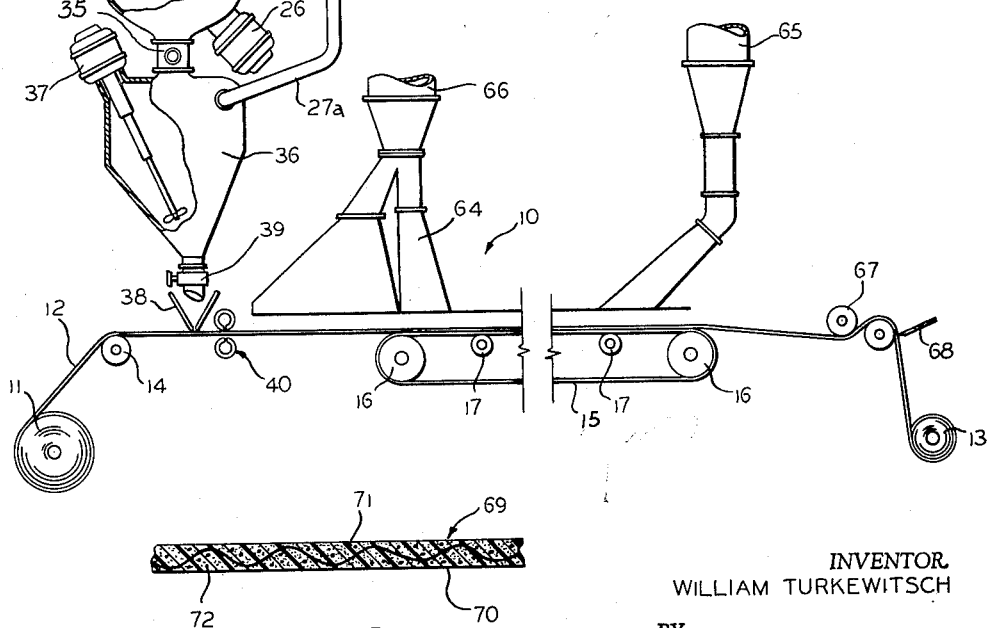
FIG.1
FIG.2
INVENTOR
WILLIAM TURKEWITSCH

United States Patent Office 3,055,360
Patented Sept. 25, 1962

3,055,360
PLASTER OF PARIS COMPOSITION AND PRODUCTION OF BANDAGES USING THE SAME
William Turkewitsch, Toronto, Ontario, Canada, assignor to The Scholl Mfg. Co., Inc., Chicago, Ill., a corporation of New York
Filed Mar. 23, 1959, Ser. No. 801,183
21 Claims. (Cl. 128—91)

The present invention is concerned broadly with a composition embodying plaster of Paris and the production of bandages using the same, and is more particularly concerned with a novel method of producing this type bandage and the article formed thereby characterized by minimum loss of the plaster during immersion and manipulation, substantial cast strength in relatively short periods of time, and essentially complete compatibility with the human skin.

Numerous methods have been suggested or employed in the past to make plaster of Paris bandages. One known method is to apply dehydrated plaster of Paris in an aqueous slurry to backing material with the aid of a binder typified by dextrine, gelatin, zein, mazein, gum arabic or the like. Hydration and crystallization thereby occur, and the plaster is then dehydrated by the application of heat under either normal or reduced pressure. Another method involves essentially the same procedure, however, hydration and crystallization are prevented by the addition of a retarder exemplified by alcohol, ammonia, hydrochloric acid, aldehyde, an organic acid or the like, the retarder being added to the aqueous slurry to prevent or retard hydration and crystallization until the water is removed. A third known method is to fortify the bandage by a resin of the melamine-formaldehyde type, and still another procedure is to bond the gypsum particles by an emulsion of a synthetic resin, using in addition a retarder to prevent hydration and crystallization. It is further known to employ water insoluble polyvinyl compounds in combination with various hydrophilic substances in organic solvents to bind the plaster of Paris. In addition, the plaster has been combined with a cellulose derivative binder which is water soluble and swells in organic solvents.

Objections and disadvantages, however, characterize each of the earlier methods. First, it is difficult to produce even products from aqueous systems in which the plaster of Paris has undergone hydration and then has to be dehydrated. On the other hand, if hydration is prevented by the use of retarders, the setting times are substantially increased, and further, materials are introduced which after a time are extremely irritating to the skin. Exemplary of such substances are the melamine-formaldehyde resins which have in many cases been found to produce serious skin irritations on not only the patient, but also the manipulator, who may be the surgeon or nurse. In addition, those methods which rely upon the use of water soluble binders which swell to a degree in organic solvents produce a bandage which suffers relatively small wet anchorage and heavy loss on immersion. In some cases this loss when the bandage is dipped in water, wrung out and molded may comprise up to 30% of the weight of plaster of Paris. Obviously, the cast strengths of such a bandage are not acceptable.

It is accordingly an important aim of the present invention to provide a plaster of Paris bandage which develops substantial cast strength within a relatively short period of time, and which is compatible with the human skin.

Another object of this invention lies in the provision of a plaster of Paris bandage which hardens sufficiently after immersion in water and proper application to give satisfactory support to broken limbs and which may be used in all cases where immobilization is desired.

Another object of the invention is to provide a powder composition for use in production of bandages formed from a fabric base, as well as for general molding applications, which comprises a mixture of essentially dehydrated plaster of Paris and a material selected from the group consisting essentially of an oxide of silicon and a mineral silicate.

Still another object of this invention is to provide a bandage structure, which comprises a fabric base and an impregnant therein comprising a powder mixture of essentially the foregoing character combined with a suitable water insoluble binder.

A further object of the present invention lies in the provision of a method of producing bandages, which comprises advancing a fabric base, applying thereon a composition as above described, and directing a fluid stream against said composition on the fabric base to impart thereto substantial porosity and to provide a bandage having a surface of uniform coarseness throughout.

A still further object of this invention is to provide apparatus for producing bandages, comprising means for advancing a fabric base; means for applying thereon a mixture of essentially dehydrated plaster of Paris, a binder, and a material selected from the group consisting essentially of an oxide of silicon and a mineral silicate; and means directing a fluid stream against said mixture on the fabric base to impart thereto substantial porosity and to provide a bandage having a surface of uniform coarseness throughout.

Other objects and advantages of the present invention will become more apparent during the course of the following description, particularly when taken in connection with the accompanying drawings.

In the drawings, wherein like numerals are employed to designate like parts throughout the same:

FIGURE 1 is a somewhat diagrammatic view, with parts in elevation, showing exemplary apparatus which may be employed to practice the method of this invention;

FIGURE 2 is a sectional view through a bandage embodying the novel concepts herein disclosed.

Figure 3:
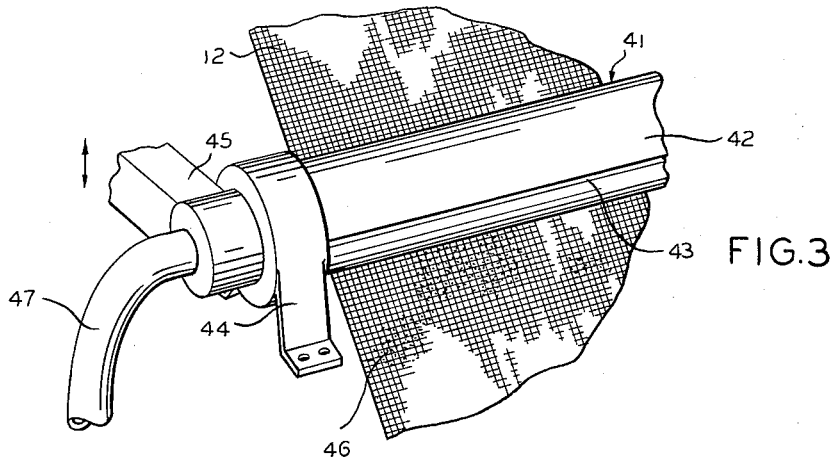
FIGURES 3, 4 and 5 are views of various means which may be utilized to direct a fluid stream against the composition of this invention after said composition has been applied to a fabric base in accordance with the method herein disclosed.

Briefly stated, the present invention is directed to a chemical composition and bandage employing this composition whereby after immersion of the bandage in water and application to a human limb there is developed substantial cast strength within a period of time no greater than 60 minutes, the composition being so constituted that utilizaion of the bandage produces no ill effects on either the patient or the manipulaor. The composition comprises plaster of Paris in a dehydrated state, a water insoluble binder dissolved in anhydrous organic solvents, and a compound selected from the group consisting essentially of an oxide of silicon and a mineral silicate. If desired, the composition may further comprise an additive of the nature of zinc oxide to render the bandage even more compatible to the skin, as well as a water soluble substance to promote the moistening of the bandage. Such a substance, which also has a binding and gelling effect, is exemplified by polyvinylpyrrolidone, and other compounds to be later disclosed.

The oxide of silicon or mineral silicate, hereinafter referred to as a siliceous substance or compound, functions when the bandage is later immersed prior to application to the limb to transfer the water used in the immersion to the plaster of Paris particles to effect their hydration and crystallization. Further, in a bandage including the water insoluble binder and plaster of Paris, the siliceous compound increases the viscosity of the moistened plaster of Paris on the bandage, renders said plaster more plastic, reduces or prevents dripping and the loss of the composition during immersion, squeezing and molding, and renders the handling of the bandage a much more clean procedure.

The plaster of Paris may be any one or a mixture of various types of known plasters, and among those which have proven well suited to the present purposes are known to those skilled in the art as the dental type, the quickset type, the orthopedic type, molding plaster, or high strength plaster. The siliceous substance, on the other hand, may be either hydrated magnesium silicate (talc), aluminum silicate (bentonite), magnesium trisilicate, magnesium silicate as produced under the name "Benagel" by the Titanium Company, magnesium aluminum silicate as offered for sale under the name "Veegum" by Vanderbilt, a silicon dioxide of relatively fine particle size of the order of 0.022 micron, or an air borne silicon dioxide. The material "Hil Sil" offered for sale by Columbian-Southern is a suitable silicon dioxide having the particle size noted, and air borne silicon dioxides which are suitable are those marketed under the name "Cab-O-Sil" by Cabot and a material known to the trade as Aerosil Degussa. The preferred range of the siliceous compound is between 0.2 and 10.0% by weight of plaster of Paris.

A composition comprising plaster of Paris of one of the types noted and a siliceous compound as described above may be employed for such applications as dental impression molding and for various technical purposes by the addition of water thereto. A more workable molding material is thus obtained, and increased strength properties result. However, for bandage applications, a water insoluble binder must be added to this composition, and it is preferred that the binder be a water insoluble plasticized cellulose derivative dissolved in an organic anhydrous solvent. A suitable solvent is ethylenedichloride or methyl hydrate, while the plasticized cellulosic may be either ethyl cellulose, cellulose acetate (normal acetyl), cellulose acetate (high acetyl), cellulose acetate-butyrate, cellulose propionate, or cellulose nitrate. The preferred concentration of either the ethyl ether, ester or mixtures of the ether or ester of the cellulose derivative is between about 0.2 and 12.0% by weight of plaster of Paris.

The cellulosic may be plasticized in known manners, utilizing as the plasticizer either the phthalates, phosphates, fatty acid esters, or others, as exemplified by acetyl triethyl citrate. As is known, the citrate named is generally suitable for all cellulosics, while diethyl phthalates or methyl or ethyl phthalyl ethyl glycolates are normally suitable for cellulose acetate. Cellulose nitrate, on the other hand, is generally plasticized by butyl phthalyl butyl glycolate or methyl or butyl acetyl ricinoleates. Other plasticizers for the cellulosics may of course be employed in accordance with current trends in the art.

Ethyl cellulose or one of the named esters of cellulose, or mixtures thereof, when suitably plasticized and carried in an appropriate anhydrous organic solvent is effective to bond the plaster of Paris particles to each other and to the backing material, which preferably is an unstarched gauze of about a 24 x 28 count. A composition of the cellulose derivative and plaster of Paris alone, without the siliceous compound, produces a bandage structure which does not moisten effectively. However, when the continuous filmlike phase of cellulose derivative and plaster, which has its natural pores, is touched with the relatively fine particles of siliceous material, which has a tendency to absorb water rapidly and does not by itself crystallize or harden, the siliceous substance transfers the water to the plaster of Paris particles and thereby effects the hydration and crystallization of said particles. As a result, there is obtained an essentially ideal moistening of the gypsum particles, the viscosity of the moistened plaster of Paris on the bandage is increased, the composition is rendered more plastic, and dripping and the loss of the gypsum during immersion, squeezing and molding is prevented. In addition, the siliceous compounds have been found to possess the property of absorbing elements contained in perspiration which naturally occurs under the plaster cast. And as was earlier noted, the addition of the siliceous materials as herein employed do not in any manner reduce the cast strength.

It has been stated that the preferred binder is ethyl cellulose or an ester of cellulose, and as is now apparent, a composition comprising plaster of Paris, a water insoluble binder and a siliceous substance when applied to a fabric base produces a bandage having markedly improved properties. However, should it be desired to enhance the moistening effect upon the gypsum particles and increase the viscosity, there may be added to the dry composition containing plaster of Paris, water soluble binder, and siliceous substance a water soluble organic material having a binding and gelling effect. Such materials are polyvinylpyrrolidone, polyvinylalcohol, hydroxyethylcellulose or a high molecular methylcellulose. Preferably one of these latter materials is employed in an amount between about 0.1 to 2.4% by weight of plaster of Paris.

A cellulose derivative such as methyl cellulose or hydroxyethylcellulose, which had been rendered insoluble by condensation reaction with dialdehydes, polybasic acids, urea formaldehyde resin, melamine-formaldehyde or the like, could also be used as a water insoluble binder in the manner earlier disclosed. However, the introduction of organic radicals may be a source of irritation to the skin, and accordingly, such binders are not preferred.

A further addition agent which may be introduced into the composition is zinc oxide for the purpose of making the cast more compatible with the human skin. The amount of zinc oxide is preferably in the range of from 0.3 to 8.5% by weight of plaster of Paris, and in this connection the zinc oxide may of course be used in a composition comprising solely plaster of Paris and a siliceous compound. It has been found that the zinc oxide does not in any sense weaken the crystalline structure of the plaster of Paris, and in fact, has produced a bandage having an even further increased cast strength.

It may be seen from the foregoing description that the preferred composition for production of plaster of Paris bandages consists of plaster of Paris, one or more of the siliceous substances, zinc oxide and a water soluble binder, these materials being blended with a solution of a water insoluble binder in an anhydrous organic solvent. However, it will also be appreciated that the zinc oxide and water soluble binder can be omitted from the bandage formulation without departing from the spirit or scope of the invention, and further, a composition for technical molding applications may comprise solely plaster of Paris and siliceous substances, or these two named materials with zinc oxide added for whitening reasons and other purposes.

While the action of the water insoluble binder may be explained in various ways, it would appear to build up a flexible, sponge-like and open-cell skeleton. Each cell contains the dry ingredients, and namely, the plaster of Paris, siliceous substances, zinc oxide, and water soluble binder. The cells vary of course, as to size. The action of the siliceous substances, on the other hand, may be additionally explained as absorbing the water in excess of the water required for crystallization of the gypsum, and to serve as an agent to increase the viscosity of the plaster mass comprising the gypsum, siliceous substances, zinc oxide and water soluble binder blended into the water insoluble binder dissolved in an organic anhydrous solvent. The viscosity referred to is that of the mass in its initial stages, that is, immediately after water immersion of the fabric carrying the mass. The desired viscosity is approximately that of a smooth, creamy cold cream, and may be within the range of 60,000 to 150,000 cps.

A preferred method of making plaster of Paris bandages employing a composition as above disclosed is to advance a fabric base, apply thereto the present composition, and direct against the composition on the fabric base a fluid stream to impart substantial porosity to the composition and to provide a bandage having a surface of uniform coarseness throughout. In this method, the dry powder materials are carefully mixed and sifted through a sieve of about 60 to approximately 200 mesh. The powder mixture is desirably then moistened with the solution of water insoluble cellulose derivatives, and applied by means of knife spreading to the fabric base, which preferably is unstarched gauze having a 24 x 28 count. It has been found that a particular viscosity of the mass and thickness of the spread creates an uneven pore system which is not reliable. Accordingly, in accordance with the present concepts, a stream of compressed air is applied from either above or below the fabric base to create a definite porosity, and at the same time provide the surface with an even coarseness which is important for express and thorough moistening of the bandage on immersion. Particular means are herein disclosed to apply the compressed air stream, and reference will be made thereto upon consideration of the drawings. However, following the application of the present composition moistened with the preferred water insoluble cellulose derivative solution, the fabric base is advanced to a dry zone to effect solvent removal and provide an essentially dry bandage structure which may then be wound upon the take-up rolls.

An exemplary form of apparatus which may be employed to practice the present method is designated generally in FIGURE 1 by the numeral 10 and may be seen to comprise a supply roll 11 from which backing material 12 is drawn by a winder roll 13 along a guide roll 14 along conveyor means 15 trained about rolls 16 and supported by rolls 17. The dry constituents of the composition are sifted in a sieve 18 having a feed portion 19 communicating with a mixer 20 having driven means 21 therein to uniformly combine the dry constituents. The sieve 18 and mixer 20 are suitably driven by power means (not shown). The dry constituents are, of course, plaster of Paris, the siliceous substances, and if desired, the water soluble binders mentioned.

The mixer 20 has a feed portion 22 connecting with a mixing tank 23 by suitable sleeve means 24, and the tank 23 is the container wherein the dry constituents and the binder are subjected to a first mixing operation. The tank 23 may be provided with a pair of mixing means 25 and 26 which desirably are of the marine type propeller construction. The tank 23 may be vented as at 27, and connecting with said tank is a conduit 28 leading to a binder mixing tank 29 suitably provided with valve means 30 to regulate the flow of binder to the mixing tank 23. The binder tank 29 is provided with mixing means 31 and a feed line 32 connecting with an organic anhydrous solvent tank (not shown). The tank 29 is vented as at 33, and the line 33 may connect with the line 27 from the mixing tank 23.

Additional anhydrous organic solvents may be introduced into the mixing tank 23 by the conduit 34, and the dry constituents and binder after suitable mixing in the tank 23 by the mixing means 25 and 26 passes through a connection 35 leading to a second mixing tank 36. The tank 36 supports mixing means 37 of essentially the same type as the means 25 and 26 used in the tank 23 and is vented at 27a. It has been found important in order to produce the desired results that the combined dry constituents and binder be continuously kept in motion in the mixing tanks 23 and 36 to assure that when the mixed mass flows into spreader means 38 through valve means 39 a predetermined level of mass will be automatically maintained and a predetermined pressure and constant weight of mass per square unit are provided in accordance with the gap in the spreader means 38 and the speed of spread.

It is to be seen from FIGURE 1 that the spreader means 38 is triangularly shaped in end view and provides a trough having a knife feed immediately adjacent the backing material 12 to flow thereon and spread thereon a composition stream of the desired thickness.

It has further been found important, in order to create a definite porosity and at the same time provide an even coarseness upon the surface of the composition-backing material combination, that this combination be subjected to one or more air streams from either above or below. The preferred means for this purpose is shown diagrammatically in FIGURE 1 and is identified therein generally by the numeral 40. Two of the air means 40 are shown, however, at a particular time only one such means would be employed, and two of such means are provided since particular conditions may dictate that the air streams be directed either upwardly or downwardly to achieve the desired results. Illustrative forms of air knife means 40 are shown in FIGURES 3, 4 and 5, and it will, of course, be appreciated that these structures may be varied to suit particular conditions.

The air knife means of FIGURE 3 is designated generally by the numeral 41 and comprises a tubular member 42 provided with an axially extending slit 43, the tubular member being received in a support member 44 to be attached in any desired manner to supporting frame work of the apparatus of FIGURE 1. The support member 44 is apertured to provide a bearing mounting for the tubular member 42, and received at one end of the member 42 is a rocker arm 45 connecting with suitable power means (not shown) to oscillate the tubular member 42 through a preferred angle of about 60° and thereby provide the desired impingement of the air stream against the composition 46 supported on the backing material 12 traveling beneath the tubular member 42. Connecting with a suitable source of compressed air is a connection 47 communicating with the interior of the tubular member 42 to flow air through the axial slit 43 therein.

Figure 4:
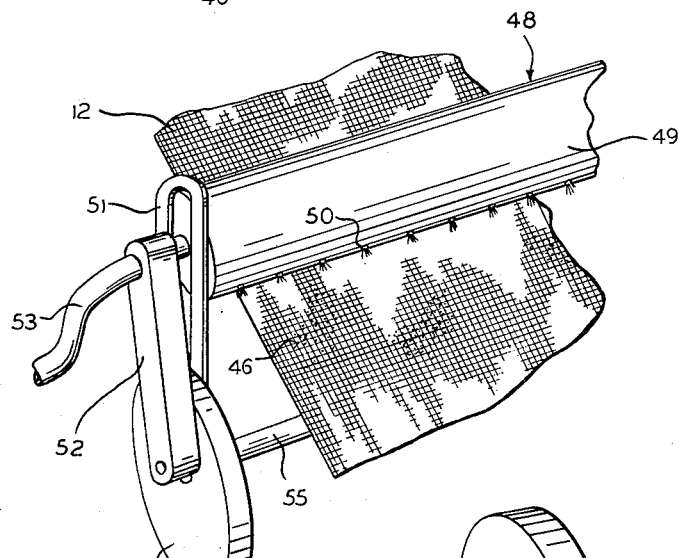

In substitution for the air knife means 41 of FIGURE 3 there may be employed air jet means 48 as shown in FIGURE 4. This construction comprises a tubular member 49 having an axially extending row of aligned openings 50, although of course more than a single row may be provided. The tubular member 49 is adjustably secured at opposite ends in bracket means 51 carried by the supporting frame work of the apparatus 10, and opposite ends of the tubular member 49 are further received in rocker arms 52 supporting at one end a compressed air connection 53 and at its opposite end wheel means 54 which travel along the supporting frame work to oscillate the rocker arms 52 and the tubular member 49 connecting therewith. The air jet means 48 extends across the width of the backing material 12, and the wheel means 54 are connected by shaft means 55 for this purpose. It is thus to be seen from FIGURE 4 that upon oscillation of the tubular member 49 the composition 46 on the backing material 12 is subjected to a staccato of air jets at a plurality of points therealong, the impingement of the air jets being timed with the spreading speed.

Figure 5:
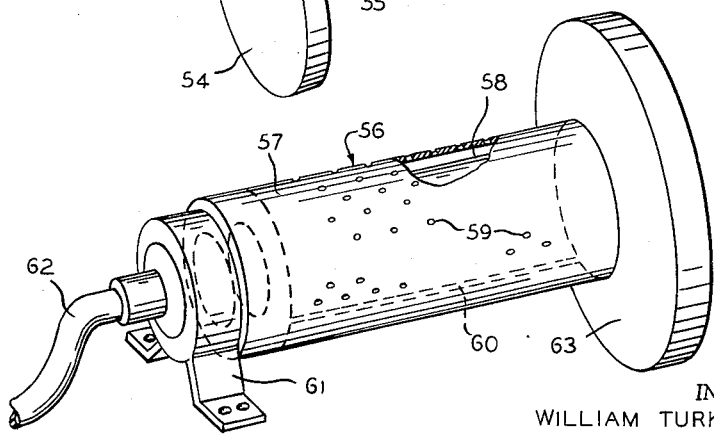

The structural arrangement of FIGURE 5 is essentially a combination of an air knife and air jet means and is designated generally in this view by the numeral 56. The air direction means 56 comprises a pair of coaxially spaced tubular members 57 and 58, the outer member 57 being provided with holes or openings 59 throughout and the inner member 58 having an axially extending slot 60 therein. The inner member 58 is stationarily mounted at opposite ends in support members 61 carried by the frame work of the apparatus 10, and a compressed air connection 62 leads to the interior of the inner conduit or tubular member. The outer sleeve or tube 57 receives a pulley 63 connecting with a suitable power source (not shown) to rotate the outer sleeve 57 with respect to the inner sleeve 58. Bearing means are of course provided to accomplish this relative rotation between the sleeve 57 and 58, and it is to be seen from FIGURE 5 that the backing material carrying the present composition thereon is subjected during its travel beneath the air direction means 56 to a staccato air stream passing through the openings 59 in the outer cylinder 57 and the slit 60 in the inner cylinder 58. As in the earlier described arrangement of FIGURE 4, the air streams issue against the forming bandage in a staccato timed with the spreading speed.

Subsequent to impingement by the air direction means 40, the composition 46 carried upon the backing material 12 passes beneath a drying tunnel 64 having an inlet 65 for hot air or other medium and an outlet or exhaust 66. The drying tunnel 64 functions to effect solvent removal from the forming bandage, and after passage to said tunnel the bandage may pass beneath a guide roll 67 to a slitter mechanism 68 and onto the winder or take-up roll 13.

The bandage as produced by the foregoing described method and apparatus is shown in FIGURE 2 and is designated therein generally by the numeral 69. It is to be seen that the bandage comprises a fabric base or backing material 70, preferably a 24 x 28 count unstarched gauze, essentially entirely impregnated by binder 71 having relatively uniformly dispersed therethrough dry ingredients 72 essentially in the form of plaster of Paris and a siliceous compound, and if used, the water soluble binder. As earlier noted, it is believed that the water insoluble binder 71 is essentially open-cellular form and that the dry ingredients are carried within each cell. For clarity of illustration, however the cell formation is not shown in FIGURE 2.

Bandages have been made utilizing various compositions as herein disclosed and specific examples are given in the following tables. The figures in the tables represent parts by weight, and the particular quantities of gypsum utilized depend of course upon a number of factors, the solvent used, the particular type of plaster, and other variables. However, in each case bandages produced by the examples shown demonstrated no appreciable loss of material during immersion and manipulation, and each bandage developed sufficient cast strength within about 60 minutes. Further, none of the bandages produced displayed any ill effects upon the patient or the manipulator as regards skin irritations. Further, it was observed during application of the present bandages to human limbs that the layers stay separate after moistening without telescoping, and the plaster material is integrated into a homogeneous mass without differentiation of the layers under the molding and stroking hand of the manipulator. In addition, there is avoided by the present invention the difficulties of earlier bandages, namely, the problem of yielding even products from aqueous systems in which the plaster of Paris has undergone hydration and has to be dehydrated. Also, as was noted earlier, the bandages earlier used had relatively long setting times when retarders were used to prevent hydration. Skin irritations frequently resulted when synthetic resins or other materials were added to the bandage, and the use of water soluble binders which swell at least in organic solvents produce bandages which suffer very small wet anchorage and heavy loss on immersion.

It will be appreciated that the composition herein disclosed is susceptible of wide variation, and further, that changes may be made in the method and apparatus herein disclosed without departing from the novel concepts of the present invention.

[Parts by weight]

| | Example | | | | |
|---|---|---|---|---|---|
| | 1 | 2 | 3 | 4 | 5 |
| BINDERS | | | | | |
| Ethyl-ether of cellulose: | | | | | |
| Ethoxy-, 10 cps | | | | | |
| Range 49%, 20 cps | | | | | |
| Ethoxy-, 50 cps | | | | | |
| Range 46%, 100 cps | | | | | |
| Nitrocellulose | | | | | |
| Cellulose-propionate | | | | | |
| Cellulose acetate-butyrate | | | | | |
| Cellulose-acetate | | | | | |
| SOLVENTS | | | | | |
| Mixture of ethylene-dichloride 80%, methyl-hydrate 20% | | | | | |
| Ether-alcohol | | | | | |
| POWDERS | | | | | |
| Plaster of Paris: | | | | | |
| Dental type | 98-90 | | | | |
| Quickset type | | 98-90 | | | |
| Orthopedic type | | | 98-90 | | |
| Moulding plaster | | | | 98-90 | |
| High-strength-plaster | | | | | 98-90 |
| Zinc oxide | | | | | |
| Talc | 2-10 | | | | |
| Magnesium-silicate (bentonite) | | 2-10 | | | |
| Magnesium-trisilicate | | | 2-10 | | |
| Magnesium-aluminum-silicate | | | | 2-10 | |
| Magnesium silicate, Benagel-Titan Co | | | | | 2-10 |
| Silicon dioxide, particle size, 0.022 mic. | | | | | |
| Airborne silicon dioxide | | | | | |
| Polyvinylpyrrolidone, mol. weight 40,000 | | | | | |
| Polyvinylpyrrolidone, mol. weight 360,000 | | | | | |
| Hydroxyethylcellulose | | | | | |
| Methyl-cellulose, methoxy, range 30%, 4,000 cps | | | | | |
| Methoxy, range 28%, 4,000 cps; hydroxy-propoxyl, 6.5% | | | | | |
| Methoxy, range 28%, 1,500 cps; hydroxy-propoxyl, 6.5% | | | | | |
| Methoxy, range 30%, 400 cps | | | | | |
| Polyvinyl alcohol, 91% sapon. med. polym | | | | | |
| Polyvinyl alcohol, 77% sapon. high polym | | | | | |

| | Example | | | | |
|---|---|---|---|---|---|
| | 6 | 7 | 8 | 9 | 10 |
| BINDERS | | | | | |
| Ethyl-ether of cellulose: | | | | | |
| Ethoxy-, 10 cps | | | | | |
| Range 49%, 20 cps | | | | 1.0 | |
| Ethoxy-, 50 cps | | | | | |
| Range 46%, 100 cps | | | | | |
| Nitrocellulose | | | | | |
| Cellulose-propionate | | | | | |
| Cellulose acetate-butyrate | | | | | |
| Cellulose-acetate | | | | | |
| SOLVENTS | | | | | |
| Mixture of ethylene-dichloride 80%, methyl-hydrate 20% | | | | 60 | |
| Ether-alcohol | | | | | |
| POWDERS | | | | | |
| Plaster of Paris: | | | | | |
| Dental type | 49.9-45 | 99.8-90 | 49-45 | 100 | 48.90-42-5 |
| Quickset type | | | | | |
| Orthopedic type | | | | | |
| Moulding plaster | | | | | |
| High-strength-plaster | 49.9-45 | | 49-45 | | 48.90-42.5 |
| Zinc oxide | | | 2-10 | | 2-10 |
| Talc | | | | | |
| Magnesium-silicate (bentonite) | | | | | |
| Magnesium-trisilicate | | | | | |
| Magnesium-aluminum-silicate | | | | | |
| Magnesium silicate, Benagel-Titan Co | | | | | |

[Parts by weight]—Continued

| | Example | | | | |
|---|---|---|---|---|---|
| | 6 | 7 | 8 | 9 | 10 |
| POWDERS—continued | | | | | |
| Silicon dioxide, particle size, 0.022 mic | 2 –10 | | | | |
| Airborne silicon dioxide | | 0.2-10 | | | 0.2 - 5 |
| Polyvinylpyrrolidone, mol. weight 40,000 | | | | | |
| Polyvinylpyrrolidone, mol. weight 360,000 | | | | | |
| Hydroxyethylcellulose | | | | | |
| Methyl-cellulose, methoxy, range 30%, 4,000 cps | | | | | |
| Methoxy, range 28%, 4,000 cps; hydroxy - propoxyl, 6.5% | | | | | |
| Methoxy, range 28% 1,500 cps; hydroxy - propoxyl, 6.5% | | | | | |
| Methoxy, range 30%, 400 cps | | | | | |
| Polyvinyl alcohol, 91% sapon. med. polym | | | | | |
| Polyvinyl alcohol, 77% sapon. high polym | | | | | |

| | Example | | | | |
|---|---|---|---|---|---|
| | 11 | 12 | 13 | 14 | 15 |
| BINDERS | | | | | |
| Ethyl-ether of cellulose: | | | | | |
| Ethoxy-, 10 cps | 1.5 | | | | |
| Range 49%, 20 cps | | | | | |
| Ethoxy-, 50 cps | | 0.8 | | | |
| Range 46%, 100 cps | | | 0.6 | | |
| Nitrocellulose | | | | 0.56 | 0.31 |
| Cellulose-propionate | | | | | |
| Cellulose acetate-butyrate | | | | | |
| Cellulose-acetate | | | | | |
| SOLVENTS | | | | | |
| Mixture of ethylene-dichloride 80%, methyl-hydrate 20% | 60 | 60 | 60 | 75 | 75 |
| Ether-alcohol | | | | 6 | 4 |
| POWDERS | | | | | |
| Plaster of Paris: | | | | | |
| Dental type | | 98.7 | 100 | 122 | 63 |
| Quickset type | 98.7 | | | | |
| Orthopedic type | | | | | |
| Moulding plaster | | | | | |
| High-strength-plaster | | | | | 63 |
| Zinc oxide | | | | | 1.0 |
| Talc | | | | 3.0 | |
| Magnesium-silicate (bentonite) | | | | | |
| Magnesium-trisilicate | | | | | |
| Magnesium-aluminum-silicate | | | | | |
| Magnesium silicate, Benagel-Titan Co | | | | | |
| Silicon dioxide, particle size, 0.022 mic | 1.3 | 1.3 | | | |
| Airborne silicon dioxide | | | | 1.0 | |
| Polyvinylpyrrolidone, mol. weight 40,000 | | | | | 1.5 |
| Polyvinylpyrrolidone, mol. weight 360,000 | | | | | |
| Hydroxyethylcellulose | | | | | |
| Methyl-cellulose, methoxy, range 30%, 4,000 cps | | | | | |
| Methoxy, range 28%, 4,000 cps; hydroxy - propoxyl, 6.5% | | | | | |
| Methoxy, range 28% 1,500 cps; hydroxy - propoxyl, 6.5% | | | | | |
| Methoxy, range 30%, 400 cps | | | | | |
| Polyvinyl alcohol, 91% sapon. med. polym | | | | | |
| Polyvinyl alcohol, 77% sapon. high polym | | | | | |

| | Example | | | | |
|---|---|---|---|---|---|
| | 16 | 17 | 18 | 19 | 20 |
| BINDERS | | | | | |
| Ethyl-ether of cellulose: | | | | | |
| Ethoxy-, 10 cps | | | | 1.5 | |
| Range 49%, 20 cps | | | | | 1.0 |
| Ethoxy-, 50 cps | | | | 0.6 | |
| Range 46%, 100 cps | 0.56 | 0.28 | | | |
| Nitrocellulose | | | | | |
| Cellulose-propionate | | | | | |
| Cellulose acetate-butyrate | | | | | |
| Cellulose-acetate | | | | | |
| SOLVENTS | | | | | |
| Mixture of ethylene-dichloride 80%, methyl-hydrate 20% | 75 | 75 | 60 | 60 | 60 |
| Ether-alcohol | | | | | |
| POWDERS | | | | | |
| Plaster of Paris: | | | | | |
| Dental type | 63 | 63 | 49.25 | 48.5 | 48.5 |
| Quickset type | 1.0 | | | | |
| Orthopedic type | | | | | |
| Moulding plaster | | | | | |
| High-strength-plaster | | 63 | 49.25 | 48.5 | 48.5 |
| Zinc oxide | | 1.0 | | | |
| Talc | | | | | |
| Magnesium-silicate (bentonite) | | | 1.5 | | |
| Magnesium-trisilicate | | | | 3.0 | |
| Magnesium-aluminum-silicate | | | | | |
| Magnesium silicate, Benagel-Titan Co | | | | | 3.0 |
| Silicon dioxide, particle size, 0.022 mic | | | | | |
| Airborne silicon dioxide | 1.0 | 1.0 | | | |
| Polyvinylpyrrolidone, mol. weight 40,000 | | | 1.5 | | |
| Polyvinylpyrrolidone, mol. weight 360,000 | | | | | |
| Hydroxyethylcellulose | 1.0 | 1.0 | | | |
| Methyl-cellulose, methoxy, range 30%, 4,000 cps | | | | | |
| Methoxy, range 28%, 4,000 cps; hydroxy - propoxyl, 6.5% | | | | | |
| Methoxy, range 28% 1,500 cps; hydroxy - propoxyl, 6.5% | | | | | |
| Methoxy, range 30%, 400 cps | | | | | |
| Polyvinyl alcohol, 91% sapon. med. polym | | | | | |
| Polyvinyl alcohol, 77% sapon. high polym | | | | | |

| | Example | | | | |
|---|---|---|---|---|---|
| | 21 | 22 | 23 | 24 | 25 |
| BINDERS | | | | | |
| Ethyl-ether of cellulose: | | | | | |
| Ethoxy-, 10 cps | | | | | |
| Range 49%, 20 cps | | | | | |
| Ethoxy-, 50 cps | | | | | |
| Range 46%, 100 cps | | | | | |
| Nitrocellulose | 0.56 | 0.56 | 0.28 | | |
| Cellulose-propionate | | | | 1.6 | 0.8 |
| Cellulose acetate-butyrate | | | | | |
| Cellulose-acetate | | | | | |
| SOLVENTS | | | | | |
| Mixture of ethylene-dichloride 80%, methyl-hydrate 20% | 60 | 60 | 60 | 60 | 60 |
| Ether-alcohol | 6 | 6 | 3 | | |
| POWDERS | | | | | |
| Plaster of Paris: | | | | | |
| Dental type | 48.5 | 49.0 | 47.2 | | 48.5 |
| Quickset type | | | | | |
| Orthopedic type | | | | 96.7 | |
| Moulding plaster | | | | | |
| High-strength-plaster | 48.5 | 49.0 | 47.2 | | 48.6 |
| Zinc oxide | | | 2.0 | 2.0 | 2.0 |
| Talc | | | | | |
| Magnesium-silicate (bentonite) | | | | | |
| Magnesium-trisilicate | | | | | |
| Magnesium-aluminum-silicate | 2.0 | | | | |
| Magnesium silicate, Benagel-Titan Co | | | | | |
| Silicon dioxide, particle size, 0.022 mic | | | | | |
| Airborne silicon dioxide | | 1.0 | 1.0 | 0.5 | 0.5 |

[Parts by weight]—Continued

| | Example | | | | |
|---|---|---|---|---|---|
| | 21 | 22 | 23 | 24 | 25 |
| POWDERS—continued | | | | | |
| Polyvinylpyrrolidone, mol. weight 40,000 | | | 1.5 | | |
| Polyvinylpyrrolidone, mol. weight 360,000 | | | | | |
| Hydroxyethylcellulose | 1.0 | 1.0 | 1.0 | 0.8 | |
| Methyl-cellulose, methoxy, range 30%, 4,000 cps | | | | | 0.4 |
| Methoxy, range 28%, 4,000 cps; hydroxy - propoxyl, 6.5% | | | | | |
| Methoxy, range 28% 1,500 cps; hydroxy - propoxyl, 6.5% | | | | | |
| Methoxy, range 30%, 400 cps | | | | | |
| Polyviny alcohol, 91% sapon. med. polym | | | | | |
| Polyvinyl alcohol, 77% sapon. high polym | | | | | |

| | Example | | | | |
|---|---|---|---|---|---|
| | 26 | 27 | 28 | 29 | 30 |
| BINDERS | | | | | |
| Ethyl-ether of cellulose: | | | | | |
| Ethoxy-, 10 cps | | | | | |
| Range 49%, 20 cps | | | | | |
| Ethoxy-, 50 cps | | | | | |
| Range 46%, 100 ps | | | | | |
| Nitrocellulose | | | | | |
| Cellulose-propionate | | 0.8 | | | |
| Cellulose acetate-butyrate | 0.4 | | | | |
| Cellulose-acetate | | | 0.8 | 0.8 | 1.0 |
| SOLVENTS | | | | | |
| Mixture of ethylene-dichloride 80%, methyl-hydrate 20% | 60 | 60 | 60 | 60 | 60 |
| Ether-alcohol | | | | | |
| POWDERS | | | | | |
| Plaster of Paris: | | | | | |
| Dental type | 48.5 | 48.5 | 48.5 | 48.5 | 48.0 |
| Quickset type | | | | | |
| Orthopedic type | | | | | |
| Moulding plaster | | | | | |
| High-strength-plaster | 48.6 | 48.6 | 48.6 | 48.6 | 48.6 |
| Zinc oxide | | | | | |
| Talc | | | | | |
| Magnesium-silicate (bentonite) | | | | | |
| Magnesium-trisilicate | | | | | |
| Magnesium-aluminum-silicate | | | | | |
| Magnesium silicate, Benagel-Titan Co | | | | | |
| Silicon dioxide, particle size, 0.022 mic | | | | | |
| Airborne silicon dioxide | 0.5 | 0.5 | 0.5 | 0.4 | 0.5 |
| Polyvinylpyrrolidone, mol. weight 40,000 | | | | | |
| Polyvinylpyrrolidone, mol. weight 360,000 | | | | | 1.0 |
| Hydroxyethylcellulose | | | | 0.8 | |
| Methyl-cellulose, methoxy, range 30%, 4,000 cps | 0.8 | | 0.4 | | |
| Methoxy, range 28%, 4,000 cps; hydroxy - propoxyl, 6.5% | | 0.4 | | | |
| Methoxy, range 28% 1,500 cps; hydroxy - propoxyl, 6.5% | | | | | |
| Methoxy, range 30%, 400 cps | | | | | |
| Polyvinyl alcohol, 91% sapon. med. polym | | | | | |
| Polyvinyl alcohol, 77% sapon. high polym | | | | | |

| | Example | | | | |
|---|---|---|---|---|---|
| | 31 | 32 | 33 | 34 | 35 |
| BINDERS | | | | | |
| Ethyl-ether of cellulose: | | | | | |
| Ethoxy-, 10 cps | | | | | |
| Range 49%, 20 cps | | | | | |
| Ethoxy-, 50 cps | | | | | |
| Range 46%, 100 ps | | | | | |
| Nitrocellulose | | | | | |
| Cellulose-propionate | | | | | |
| Cellulose acetate-butyrate | 0.5 | 0.5 | 0.5 | 0.6 | 0.6 |
| Cellulose-acetate | | | | | |
| SOLVENTS | | | | | |
| Mixture of ethylene-dichloride 80%, methyl-hydrate 20% | 60 | 60 | 60 | 60 | 60 |
| Ether-alcohol | | | | | |
| POWDERS | | | | | |
| Plaster of Paris: | | | | | |
| Dental type | 49.0 | 49.0 | 49.0 | 63.0 | 63.0 |
| Quickset type | | | | | |
| Orthopedic type | | | | | |
| Moulding plaster | | | | | |
| High-strength-plaster | 48.5 | 48.5 | 48.5 | 63.0 | 63.0 |
| Zinc oxide | 1.6 | 1.6 | 1.6 | 2.0 | 2.0 |
| Talc | | | | | |
| Magnesium-silicate (bentonite) | | | | | |
| Magnesium-trisilicate | | | | | |
| Magnesium-aluminum-silicate | | | | | |
| Magnesium silicate, Benagel-Titan Co | | | | | |
| Silicon dioxide, particle size, 0.022 mic | | | | | |
| Airborne silicon dioxide | 0.4 | 0.4 | 0.4 | 0.5 | 0.5 |
| Polyvinylpyrrolidone, mol. weight 40,000 | | | | | |
| Polyvinylpyrrolidone, mol. weight 360,000 | | | | | 0.6 |
| Hydroxyethylcellulose | | | | | |
| Methyl-cellulose, methoxy, range 30%, 4,000 cps | 0.5 | | | | |
| Methoxy, range 28%, 4,000 cps; hydroxy - propoxyl, 6.5% | | | | | |
| Methoxy, range 28% 1,500 cps; hydroxy - propoxyl, 6.5% | | 0.5 | | | |
| Methoxy, range 30%, 400 cps | | | 0.5 | | |
| Polyvinyl alcohol, 91% sapon. med. polym | | | | 0.6 | |
| Polyvinyl alcohol, 77% sapon. high polym | | | | | |

I claim as my invention:

1. A bandage structure, which comprises a backing material, a flexible, open-cell and sponge-like mass therein comprising a plasticized cellulose derivative, and dry ingredients in said cells including a dehydrated plaster of Paris and a siliceous compound selected from the group consisting of magnesium silicate, magnesium trisilicate, magnesium aluminum silicate and silicon dioxide mixtures thereof.

2. A bandage structure of the character defined in claim 1, wherein the dry ingredients further include zinc oxide and a water soluble binder.

3. A composition for use in the production of bandages from a fibrous base, which comprises an impregnant comprising a water insoluble organic binder selected from the group consisting of ethyl cellulose and an ester of cellulose, said binder being dissolved in an anhydrous organic solvent, and a mixture of essentially dehydrated plaster of Paris and a material selected from the group consisting of an oxide of silicon and a magnesium silicate and mixtures thereof, the organic binder being present in an amount between 0.2 and 12.0% and the siliceous material in an amount between 0.2 and 10.0%, the percentages being by weight of plaster of Paris.

4. A composition for use in the production of bandages from a fibrous base, which comprises a mixture of a water insoluble organic binder, said binder being dissolved in an anhydrous organic solvent, zinc oxide, an organic additive selected from the group consisting of polyvinylalcohol, polyvinylpyrrolidone, hydroxyethylcellulose, and high molecular methylcellulose and mixtures thereof, essentially dehydrated plaster of Paris, and a material selected from the group consisting of an oxide of silicon and a magnesium silicate and mixtures thereof.

5. A composition for use in the production of bandages from a fibrous base, which comprises a mixture of water insoluble organic binder, said binder being dissolved in an anhydrous organic solvent, zinc oxide, an organic additive selected from the group consisting of polyvinylalcohol, polyvinylpyrrolidone, hydroxyethylcellulose, and high molecular methylcellulose and mixtures thereof, essentially dehydrated plaster of Paris, and a material selected from the group consisting of magnesium silicate, magnesium trisilicate, magnesium aluminum silicate and silicon dioxide and mixtures thereof.

6. A composition for use in the production of bandages from a fibrous base, which comprises a mixture of a water insoluble organic binder, said binder being dissolved in an anhydrous organic solvent, zinc oxide, an organic additive selected from the group consisting of polyvinylalcohol, polyvinylpyrrolidone, hydroxyethylcellulose, and high molecular methylcellulose and mixtures thereof, essentially dehydrated plaster of Paris and a material selected from the group consisting of magnesium silicate, magnesium trisilicate, magnesium aluminum silicate and silicon dioxide and mixtures thereof, the zinc oxide being present in an amount between 0.3 and 8.5%, the organic binder between 0.2 and 12.0%, the organic additive between 0.1 and 2.4%, and the siliceous compound between 0.2 and 10.0%, the percentages being based on weight of plaster of Paris.

7. A method of producing bandages, which comprises advancing a fibrous backing material, applying thereon from an anhydrous organic solvent a mixture of water insoluble binder and an essentially dehydrated plaster of Paris and a material selected from the group consisting of an oxide of silicon and a magnesium silicate and mixtures thereof, and directing an oscillating fluid stream against the mixture on the backing material to impart thereto substantial porosity and provide a bandage having a surface of uniform coarseness throughout.

8. A method of producing bandages, which comprises advancing a fibrous backing material, applying thereon from an anhydrous organic solvent a mixture comprising a water insoluble organic binder, a water soluble binder, a dehydrated plaster of Paris, zinc oxide and a siliceous compound selected from the group consisting of an oxide of silicon and a magnesium silicate and mixtures thereof, and directing an oscillating fluid stream against the mixture on the backing material to impart thereto substantial porosity and provide a bandage having a surface of uniform coarseness throughout and characterized by rapid and thorough moistening.

9. A method of producing bandages, which comprises advancing a fibrous backing material, applying thereon a mixture comprising a water insoluble organic binder in an anhydrous organic solvent, a dehydrated plaster of Paris and a siliceous compound selected from the group consisting of an oxide of silicon and a magnesium silicate and mixtures thereof, directing an oscillatory fluid stream against the mixture on the backing material to impart thereto substantial porosity and provide a bandage having a surface of uniform coarseness throughout and advancing the mixture and backing material through a drying zone to evaporate the solvent and form said mixture in the backing material into a well-anchored and flexible mass.

10. A method of producing bandages, which comprises combining in an anhydrous organic solvent a water insoluble organic binder wtih a mixture of a dehydrated plaster of Paris and a siliceous compound selected from the group consisting of an oxide of silicon and a magnesium silicate and mixtures thereof, to form a flowable composition, applying said composition to a fabric base, and directing at least one oscillating air stream against the composition on the base to impart thereto substantial porosity and provide a bandage having a surface of uniform coarseness throughout.

11. A method of producing bandages, which comprises combining a water insoluble organic binder in an anhydrous organic solvent wtih a mixture of a dehydrated plaster of Paris and a siliceous compound selected from the group consisting of an oxide of silicon and a magnesium silicate and mixtures thereof to form a flowable composition, continuously mixing said binder with the mixture, applying said composition to a fabric base, directing at least one oscillating air stream against the composition on the base to impart thereto substantial porosity and provide a bandage having a surface of uniform coarseness throughout, and drying the composition to drive off the solvent to form the same into a well-anchored and flexible mass in the fabric base.

12. Apparatus for producing bandages, comprising means for advancing a fibrous backing material, means for applying thereon a mixture of a water insoluble binder, an essentially dehydrated plaster of Paris and a material selected from the group consisting of an oxide of silicon and a mineral silicate and mixtures thereof, and means for directing an oscillating fluid stream against the mixture on the backing material to impart thereto substantial porosity and provide a bandage having a surface of uniform coarseness throughout.

13. Apparatus for producing bandages, comprising a container for housing a flowable composition, spreader means receiving said composition and applying the same to a fabric base, and air direction means applying at least one oscillating air stream against the composition to impart thereto substantial porosity and provide a bandage having a surface of uniform coarseness throughout.

14. Apparatus for producing bandages, comprising a container for housing a flowable composition, spreader means receiving said composition and applying the same directly to a fabric base, and air direction means applying at least one oscillating air stream against the composition to impart thereto substantial porosity and provide a bandage having a surface of uniform coarseness throughout.

15. Apparatus for producing bandages, comprising a container for housing a flowable composition, spreader means receiving said composition and applying the same directly to a fabric base, and air direction means applying at least one oscillating air stream against the composition to impart thereto substantial porosity and provide a bandage having a surface of uniform coarseness throughout, said air direction means comprising a pair of coaxially spaced tubular members extending essentially entirely across the width of the fabric base, one of said members being perforated and the other of said members having an axially extending slit therein directing the air stream against the composition.

16. A bandage structure comprising a fibrous base and an impregnant therein comprising a water insoluble binder of sponge-like character having dispersed therein a mixture of a hydratable plaster of Paris wtih a siliceous material selected from the group consisting of silicon oxide and a magnesium silicate.

17. The bandage of claim 16 in which said binder is a water insoluble cellulosic derivative.

18. The bandage of claim 16 in which said water insoluble binder is selected from the group consisting of ethyl cellulose, cellulose acetate, cellulose acetate-buyrate, cellulose propionate, and cellulose nitrate.

19. The bandage of claim 16 in which said siliceous material constitutes from 0.2 to 10.0% by weight of the plaster of Paris present.

20. A composition for the production of bandages on a fibrous base comprising a water insoluble organic binder dissolved in an organic anhydrous solvent and containing a mixture of hydratable plaster of Paris and a siliceous material selected from the group consisting of magnesium silicate, magnesium trisilicate, magnesium aluminum silicate, silicon dioxide, and mixtures thereof.

21. The composition of claim 20 in which said binder is a water insoluble cellulosic derivative.

References Cited in the file of this patent

UNITED STATES PATENTS

| | | |
|---|---|---|
| 14,320 | Lincoln | Feb. 26, 1856 |
| 1,212,725 | Wolpe | Jan. 16, 1917 |
| 1,229,284 | Kempel | June 12, 1917 |
| 1,609,937 | Forrest | Dec. 7, 1926 |
| 2,258,142 | Padelford | Oct. 7, 1941 |
| 2,563,259 | Miller | Aug. 7, 1951 |
| 2,655,148 | Eberl | Oct. 13, 1953 |
| 2,700,615 | Heijmer | Jan. 25, 1955 |
| 2,960,984 | Parker | Nov. 22, 1960 |

FOREIGN PATENTS

| | | |
|---|---|---|
| 510,273 | Great Britain | July 31, 1939 |